H. PAULETT, W. A. JONES & W. HUGHES.
COOKING OVEN.
APPLICATION FILED JUNE 27, 1916.
1,272,514.
Patented July 16, 1918.
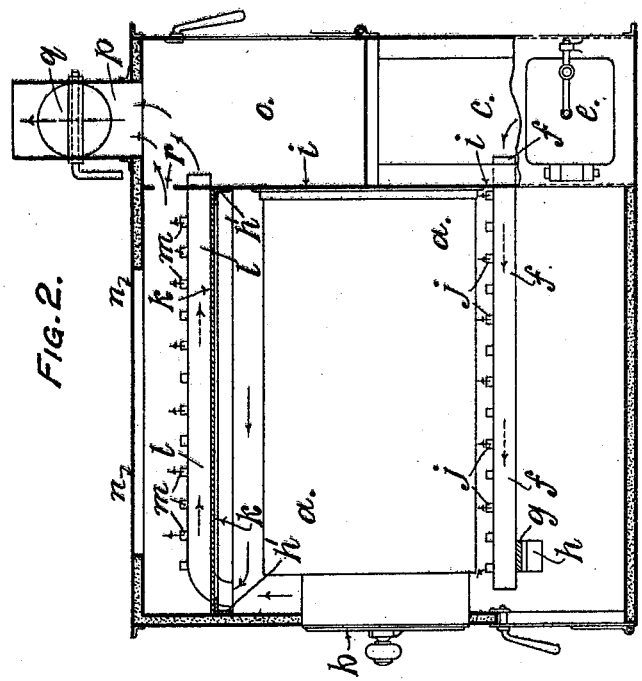
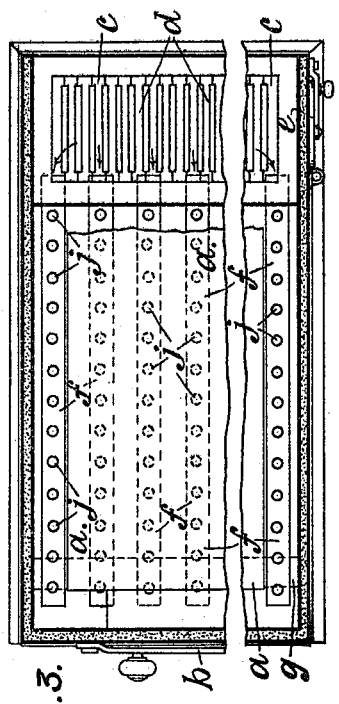
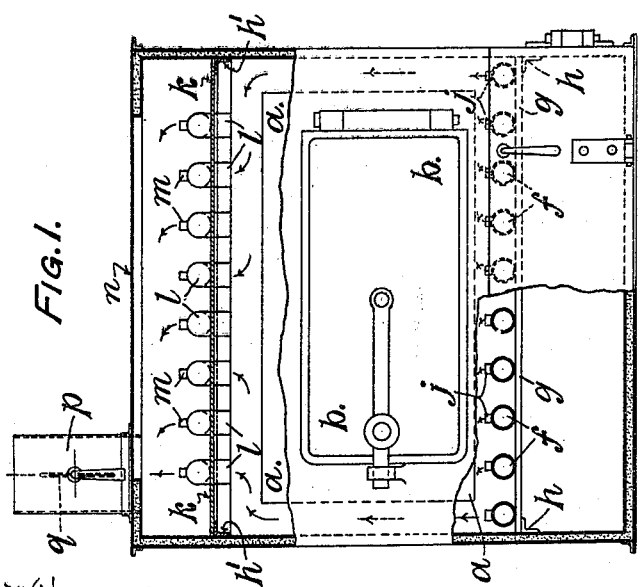
Inventors
Henry Paulett,
William Aubrey Jones,
William Hughes,

UNITED STATES PATENT OFFICE.

HENRY PAULETT, OF GODRERGRAIG, WILLIAM AUBREY JONES, OF SWANSEA, AND WILLIAM HUGHES, OF YSTALYFERA, WALES.

COOKING-OVEN.

1,272,514.    Specification of Letters Patent.    Patented July 16, 1918.

Application filed June 27, 1916. Serial No. 106,171.

*To all whom it may concern:*

Be it known that we, HENRY PAULETT, a subject of the King of England, residing at Gnoll Road, Godrergraig, in the county of Glamorgan, South Wales, baker, WILLIAM AUBREY JONES, a subject of the King of England, residing at 75 Rhyddings Park road, Swansea, in the county of Glamorgan, South Wales, merchant, and WILLIAM HUGHES, a subject of the King of England, residing at 42 Gurnos road, Ystalyfera, in the county of Glamorgan, South Wales, master baker, have invented certain new and useful Improvements in Cooking-Ovens, of which the following is a specification.

This invention relates to baking or cooking ovens, but is more particularly applicable to bakers' ovens, *i. e.* ovens for the baking of bread and the like; and has for its objects to provide an oven which shall be simple in construction, and thus cheaply manufactured; efficient in use; and wherein a hot-plate forms an integral part thereof.

We will describe our invention with the aid of the accompanying sheets of explanatory drawings, which illustrate, by way of example only, one mode of embodying same.

In said drawings:—

Figure 1 is a front elevation, partly in section, of an oven;

Fig. 2 is a side sectional elevation; and

Fig. 3 is a sectional plan.

Referring to the drawings, $a$ represents a compartment in which the articles to be baked are placed, which is preferably of the usual or ordinary bakers' type and lined as required with tiles, firebricks, fireclay, or any other suitable lining, and $b$ indicates the door thereof.

Below and at the rear end of said compartment $a$ is arranged a fireplace or furnace $c$ fitted with suitable grate bars $d$, and provided with a fire door $e$. Disposed below said oven $a$ is a series of open ended pipes or tubes $f$ which are supported at one end by a bearer $g$ resting on angle irons $h$ and at the other end they are supported by and extend through a tube plate or wall $i$. On each of said pipes or tubes $f$ is formed or provided a plurality of upwardly projecting jets or nozzles $j$ which extend toward but do not touch the bottom of said compartment $a$. At a suitable distance above the top of said compartment is fitted on angle irons $h^1$ a plate $k$, and above said plate is arranged a second series of open ended pipes or tubes $l$ formed or provided with upwardly projecting jets or nozzles $m$ which extend toward but do not touch the underside of a hot plate designated $n$ which constitutes part of the top of the oven casing. One end of each of said tubes $l$ extends downwardly through and below said plate $k$—which otherwise is imperforate—and the other end extends through said tube plate or wall $i$ and projects into chamber $o$. An aperture $r$ is provided in said tube plate $i$ above said jets or nozzles $m$.

The inclosing walls or casing of said oven are preferably where practicable, of double construction, the space between the walls being packed with a suitable heat insulating material, such for instance as silicate cotton or slag wool.

When the oven is in use, the heated gases of combustion generated in the furnace $c$ enter said tubes $f$ and emerge from the jets or nozzles $j$ thereof being thus brought into intimate contact with the whole of the bottom of said compartment $a$; the gases then pass up the sides of the compartment as shown in Fig. 1 and enter the space between the compartment top and plate $k$ from whence they pass into the downwardly projecting ends of the pipes or tubes $l$, emerging through the jets or nozzles $m$ thereof to heat the plate $n$; thence the gases pass by way of said aperture $r$ in tube plate $i$ into the chamber $o$ and away by the flue $p$, the draft whereof is controlled by means of the damper valve $q$.

By the method of heating just described the gases at high temperature pass completely around and in intimate contact with the walls of compartment $a$, and when reduced in temperature somewhat are brought into intimate contact with the hot plate $n$.

Our invention is particularly applicable to portable ovens for field use.

Having now described our invention, what we claim as new and desire to secure by Letters Patent is:—

1. An oven, comprising a compartment, in which the articles to be baked are placed, a hot plate in spaced relation to the top thereof, a fire place arranged at a lower level than said compartment, pipes below said compartment adapted to receive hot air and gases from said fire place, jets carried by said pipes for admitting the air and gases to said oven to heat the bottom and side walls of said compartment, pipes below said hot plate having ends thereof depending to receive the air and gases from about said compartment, jets carried by said pipe for directing air and gases against said hot plate, and an exhaust for the last mentioned pipes.

2. An oven comprising a compartment, in which the articles to be baked are placed, with spaces thereabout, a hot plate forming the top of said compartment, a fire place, arranged at a lower level than said compartment, a series of pipes establishing communication between said fireplace and the spaces about said compartment so that heated gases may enter said oven and heat the walls of said compartment, and a series of pipes between said hot plate and the top of said compartment adapted to receive the heated gases from about said compartment and heat said hot plate.

3. An oven comprising a compartment, in which the articles to be baked are placed, having walls with spaces thereabout, a hot plate forming the top of said oven, a fireplace, arranged at a lower level than said compartment, a series of pipes below said compartment in communication with said fire place, jets carried by said pipes and adapted to admit heated gases to the spaces about said compartment, a series of pipes below said hot plate in communication with the spaces about said compartment and adapted to receive heated gases therefrom, and a series of jets carried by said last mentioned series of pipes adapted for distributing the hot gases beneath said hot plate.

In testimony whereof we affix our signatures in the presence of two witnesses.

HENRY PAULETT.
WILLIAM AUBREY JONES.
WILLIAM HUGHES.

Witnesses:
EWART HAYDEN WILCOX,
PHILLIP WILLIAMS.

Copies of this patent may be obtained for five cents each, by addressing the "Commissioner of Patents, Washington, D. C."